United States Patent
Mathias et al.

(10) Patent No.: US 9,691,379 B1
(45) Date of Patent: Jun. 27, 2017

(54) SELECTING FROM MULTIPLE CONTENT SOURCES

(71) Applicant: Rawles LLC, Wilmington, DE (US)

(72) Inventors: Lambert Mathias, Arlington, VA (US); Stephen Frederick Potter, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 115 days.

(21) Appl. No.: 14/316,613

(22) Filed: Jun. 26, 2014

(51) Int. Cl.
*G10L 15/22* (2006.01)
*G06F 3/16* (2006.01)
*G10L 15/18* (2013.01)

(52) U.S. Cl.
CPC ................ *G10L 15/1815* (2013.01)

(58) Field of Classification Search
CPC .................................. G10L 15/1815
USPC ..................... 704/263–270.1, 275
See application file for complete search history.

(56) References Cited

U.S. PATENT DOCUMENTS

| | | | |
|---|---|---|---|
| 7,249,122 B1* | 7/2007 | Bushee | G06F 17/30864 |
| 7,418,392 B1 | 8/2008 | Mozer et al. | |
| 7,720,683 B1 | 5/2010 | Vermeulen et al. | |
| 7,774,204 B2 | 8/2010 | Mozer et al. | |
| 7,987,280 B1* | 7/2011 | Putnam | H04L 65/1076 704/219 |
| 9,190,055 B1* | 11/2015 | Kiss | G10L 15/063 |
| 2007/0033005 A1* | 2/2007 | Cristo | G06F 17/279 704/9 |
| 2007/0282860 A1* | 12/2007 | Athineos | G06F 17/30743 |
| 2010/0145708 A1* | 6/2010 | Master | A47C 21/003 704/270 |
| 2012/0223885 A1 | 9/2012 | Perez | |
| 2013/0191122 A1* | 7/2013 | Mason | G06F 17/30017 704/231 |
| 2013/0275164 A1* | 10/2013 | Gruber | G10L 17/22 705/5 |
| 2014/0244660 A1* | 8/2014 | Lewis | G06F 17/30864 707/748 |
| 2015/0100605 A1* | 4/2015 | Golden | G06F 17/30958 707/798 |

FOREIGN PATENT DOCUMENTS

WO  WO2011088053 A2  7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

*Primary Examiner* — Marcellus Augustin
(74) *Attorney, Agent, or Firm* — Lee & Hayes, PLLC

(57) ABSTRACT

A speech-based system may be configured to receive and act upon spoken requests from a user. In some cases, a spoken request may ask the system to play content such as music without specifying from which of multiple available content sources the music is to be obtained. In response to such a request, the system analyzes feature scores for each of the content sources. The feature scores indicate usage characteristics of the different sources by a current user or groups of users. The features scores for a particular source may be averaged or otherwise combined to create a composite score, and the source having the highest composite score is selected as the source of the requested content.

19 Claims, 4 Drawing Sheets

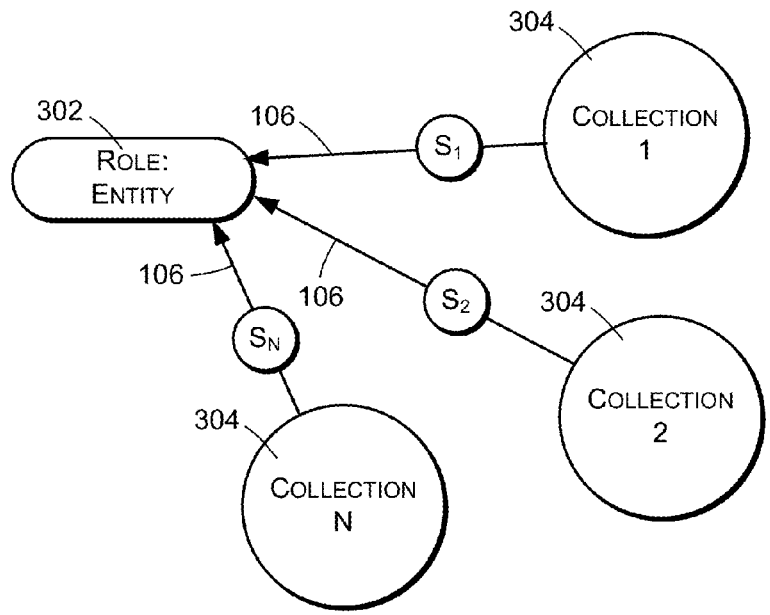

FIG. 3

| ROLE:ENTITY | | | | |
|---|---|---|---|---|
| | FEATURE 1 | FEATURE 2 | FEATURE ... | FEATURE M |
| COLLECTION 1 | SCORE | SCORE | SCORE | SCORE |
| COLLECTION 2 | SCORE | SCORE | SCORE | SCORE |
| COLLECTION ... | SCORE | SCORE | SCORE | SCORE |
| COLLECTION N | SCORE | SCORE | SCORE | SCORE |
| ROLE:ENTITY | | | | |
| | FEATURE 1 | FEATURE 2 | FEATURE ... | FEATURE M |
| COLLECTION 1 | SCORE | SCORE | SCORE | SCORE |
| COLLECTION 2 | SCORE | SCORE | SCORE | SCORE |
| COLLECTION ... | SCORE | SCORE | SCORE | SCORE |
| COLLECTION N | SCORE | SCORE | SCORE | SCORE |
| ROLE:ENTITY | | | | |
| | FEATURE 1 | FEATURE 2 | FEATURE ... | FEATURE M |
| COLLECTION 1 | SCORE | SCORE | SCORE | SCORE |
| COLLECTION 2 | SCORE | SCORE | SCORE | SCORE |
| COLLECTION ... | SCORE | SCORE | SCORE | SCORE |
| COLLECTION N | SCORE | SCORE | SCORE | SCORE |
| ROLE:ENTITY | | | | |
| | FEATURE 1 | FEATURE 2 | FEATURE ... | FEATURE M |
| COLLECTION 1 | SCORE | SCORE | SCORE | SCORE |
| COLLECTION 2 | SCORE | SCORE | SCORE | SCORE |
| COLLECTION ... | SCORE | SCORE | SCORE | SCORE |
| COLLECTION N | SCORE | SCORE | SCORE | SCORE |

FIG. 4

SELECTING FROM MULTIPLE CONTENT SOURCES

BACKGROUND

It is becoming more and more practical to interact with devices through speech. Because of increasing processing capabilities and advanced processing techniques, devices are able to perform automatic speech recognition (ASR) and natural language understanding (NLU) to understand spoken requests by users. However, in spite of the constantly improving capabilities of such systems, certain situations can still present challenges when attempting to resolve ambiguities in user requests.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3 is a graph showing relationships and feature scores of a role:entity pair and multiple content collections.

FIG. 4 shows an example of a feature score table.

DETAILED DESCRIPTION

Described herein are systems, devices, and techniques for resolving ambiguities in user requests for content. Ambiguities such as this may arise when a user requests content that is available from multiple sources, without explicitly identifying which of the sources should be used for obtaining the content.

As an example in the context of music, a spoken request may express an intent to play music and may also identify the particular content that is desired. Automatic speech recognition (ASR) may be used to recognize the user's speech. Natural language understanding (NLU) may be used to determine the meaning or intent of the recognized speech. In this example, the NLU may determine that the user has expressed a "play music" intent. Analysis of the user speech by the NLU may also detect a semantic role and a corresponding entity that fills the semantic role. For example, a user request may indicate a semantic role of "artist," "album," and/or "track" and a corresponding entity that fills the role.

Although music that matches the detected role and entity may exist in several music services, libraries, or accounts, the user request does not identify the particular collection from which the music is to be obtained. In order to resolve this ambiguity, available collections may be queried to determine which of the collections have the requested music. Feature scores of the collections may then be compared to select one of the collections, and the music may be obtained from the selected collection.

A feature score corresponds to a feature of a collection such as a relationship of the collection to the detected role and entity and/or to one or more users. For example, a feature score may indicate the amount of usage of a particular music collection for obtaining the matching music. Features are considered to be global when they are based on historical usage metrics of groups or categories of multiple users. Features are considered local when they are based only on the historical usage patterns of the current user.

Figure 1:
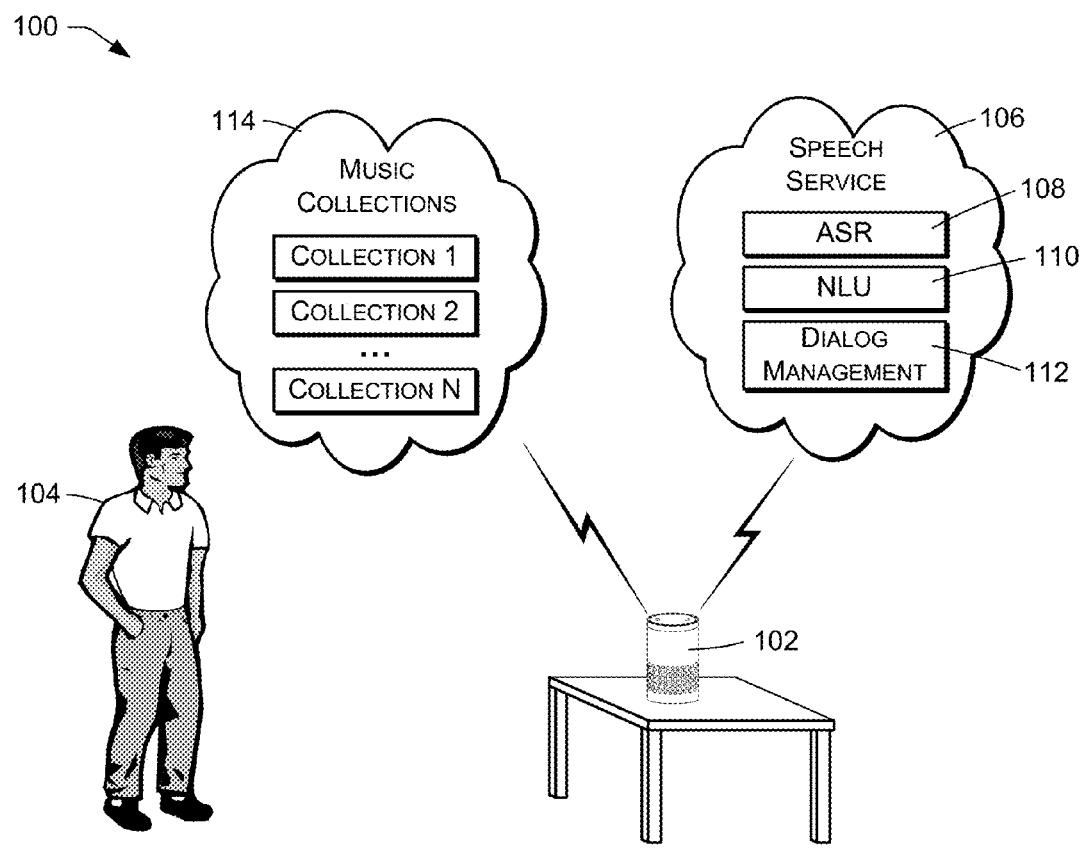
FIG. 1 shows an illustrative speech-based system for use with content collections or sources.

FIG. 1 shows an example speech-based system 100 that allows users to interact with local and remote computing resources predominantly through speech. The speech-based system 100 includes an electronic speech interface device 102 with which a user 104 may interact. In the illustrated implementation, the speech interface device 102 is positioned on a table within a room. In other implementations, it may be placed in any number of locations (e.g., ceiling, wall, in a lamp, beneath a table, under a chair, etc.). Furthermore, more than one speech interface device 102 may be positioned in a single room and different speech interface devices 102 may be positioned in different rooms of user premises.

The interface device 102 may in some embodiments comprise a network-based or network-accessible device having one or more microphones, one or more speakers, and one or more network interfaces or other communication interfaces. For example, the interface device 102 may have a Wi-Fi® interface for wireless network communications and a Bluetooth® interface for wirelessly communicating with local devices and peripherals.

The speech-based system 100 may include a speech-based service 106 that receives real-time audio or speech information from the interface device 102 in order to detect user utterances, to determine user intent based on the utterances, and/or to perform actions or provide services in fulfillment of the user intent. The speech-based service 106 may also generate and provide speech and other audio for playback by the interface device 102. In some cases, the speech-based service 106 may conduct speech interactions or dialogs with the user 104 using the microphone and speaker capabilities of the interface device 102. A speech dialog comprises an alternating sequence of user utterances and system speech responses or questions.

The speech-based service 106 may in some embodiments be implemented as a network-based or cloud-based service, as illustrated in FIG. 1. Communications between the interface device 102 and the service 106 may use various types of data communications networks, including local-area networks, wide-area networks, and/or the public Internet. Cellular and/or other wireless data communications technologies may also be used for communications. The speech-based service 106 may serve a large number of interface devices 102, which may be located in the premises of many different users. Furthermore, the speech-based service 106 may represent a collection of services, which may be provided by numerous different servers, components, sources, and/or entities. Generally, the speech-based service 106 may be implemented by multiple computer servers as described below with reference to FIG. 6.

The speech-based service 106 may be configured to interact with the user 104 by speech through the interface device 102 to determine a user intent and to provide a function or service in response to or in fulfillment of the user intent. Provided services may include performing actions or activities, rendering media, obtaining and/or providing information, providing information via generated or synthesized speech via the interface device 102, initiating Internet-based services on behalf of the user 104, and so forth.

An audio stream may be provided from the interface device 102 to the speech-based service 106. The audio stream may contain user speech and/or user queries, and may be processed by the speech-based service 106 in various ways to determine the meaning of the user's speech and/or the intent expressed by the queries. For example, the speech-based service 106 may implement automated speech recognition (ASR) component 108 to obtain a textual representation of user speech that occurs within the audio stream. The ASR component 108 may be followed by a natural language understanding (NLU) component 110 to determine the intent expressed by an utterance of the user 104. The speech-based service 106 may also have a command execution and/or dialog management component 112 to compose and/or implement commands in fulfilment of determined user intent and/or to conduct interactive dialogs with the user 104 in order to determine user intent. Commands corresponding to determined user intents may be performed by the speech-based service 106 either independently or in conjunction with the interface device 102, such as by generating speech or other audio that is subsequently rendered by the interface device 102.

The system 100 may have or have access to multiple music collections 114, which are illustrated as collections 1 through N. Some of the music collections 114 may comprise remote, network-accessible music services, also referred to as cloud-based services. These music services may include free services, and may also include fee-based subscription services. The user 104 may have accounts with the music services allowing the user to access and play music tracks from large and unrestricted online libraries.

Online or network-accessible music services may also include services from which a user purchases individual content titles such as tracks or albums. When using these types of services, the collection available to an individual user may be limited to those titles that the user has purchased.

The music collections 114 may also include personal, user-owned music libraries, which may be stored online, on local storage devices, and/or on personal user devices such as smartphones, media players, tablet computers, personal computers, and so forth. Personal user music libraries may be available via network connection, by direct connection to devices holding the collections, and/or through point-to-point or device-to-device wireless communication technologies such as Bluetooth®.

In some cases, a household may include several users 104, each of which may have different accounts with one or more music services and may have their own personal music libraries or collections.

The system 100 is configured to locate, select, and play music in response to appropriate spoken user commands. For example, a user may state "Open XYZ music service to play the song Angie by the Rolling Stones." In response, the system 100 may connect to the XYZ music service, begin streaming the requested song to the interface device 102, and play the requested song on the speaker of the interface device 102.

A user may request content at varying levels of specificity. For example, the user may state simply to "play the stones." Various ambiguities are present in a statement such as this. For example, it is not clear whether the term "stones" refers to an artist or to part of a song title. In addition, the statement does not identify which of multiple music collections should be used to obtain the requested content, especially when the requested music is available from more than one of the music collections.

Various techniques are available for resolving ambiguities in user requests. The techniques described herein relate to resolving ambiguities regarding which of multiple music services or collections should be used when responding to a user request to obtain or play content such as music.

Figure 2:
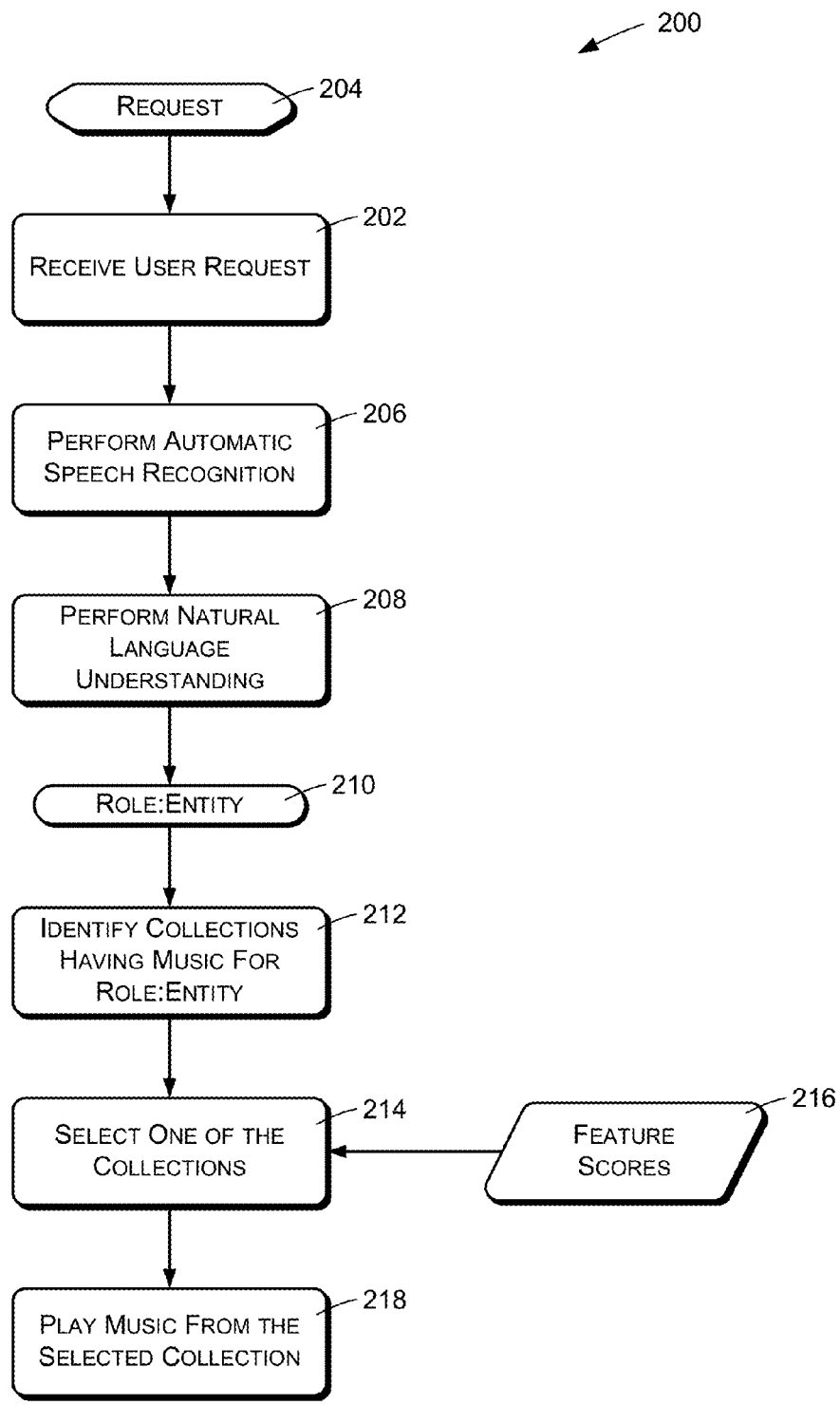
FIG. 2 is a flow diagram illustrating an example method of obtaining content in response to a natural language request.

FIG. 2 illustrates an example method 200 of responding to a user request to obtain or play content. The method 200 is described in the context of requesting and playing music. However, the described techniques also apply to other types of content and to different activity domains. The described actions may be performed by the interface device 102, by the speech-based service 106, by both the interface device 102 and the speech-based service 106 working in conjunction with each other, and/or by other services and components that are not described herein.

An action 202 comprises receiving a spoken utterance or other natural language request 204 from a current user of the system 100. The request 204 may be received at a microphone of the interface device 102 and received by the speech-based services 108 as part of an audio stream provided from the interface device 102 to the speech-based service 106.

The spoken request 204 may specify an intent corresponding to an action to be performed by the system 100. The request 204 may also specify one or more sematic roles or slots that relate to the intent.

When using NLU techniques, an intent or action is often represented by a frame or grouping of facts and/or objects that help define the intent or action. The facts and objects are referred to as semantic "roles" or "slots". A semantic role may be filled by a value, which is referred to as an "entity." As an example, the spoken request 204 may express a "play music" intent or action along with a semantic role and corresponding entity. The semantic role may comprise one or more of (a) artist, (b) album, or (c) track. The role of "artist" may, as an example, be filled by the entity "The Rolling Stones."

Actions 206 and 208 comprise analyzing the spoken request 204 to determine the expressed intent and to detect any semantic roles and corresponding entities indicated by the spoken request 204. The action 206 comprises performing automatic speech recognition (ASR) on the spoken utterance to determine a textual representation of user speech contained in the spoken utterance 204. The ASR may be performed by the ASR component 108 of the speech-based service 106. The action 208 comprises performing natural language understanding (NLU) on the spoken request 204, based on the textual representation provide by the ASR component 108. The NLU may be performed by the NLU component 110 of the speech-based service 106. The NLU action 208 detects which of the available roles have been specified by the utterance 204 and also detects the entities that fill those roles.

A particular intent defined within the system 100 may have a number of semantic roles, any of which may or may not be specified in any particular user utterance. When expressing the "play music" intent, for example, a user may specify less than all of the available semantic roles. For example, the user may state "Play music by the Rolling Stones," which indicates an entity for the "artist" role but does not fill the "track" or "album" roles.

In the context of the system 100, in which music may be available from multiple collections 114, a play music intent may also have a "collection" role or similar role that may be filled by one of the available music collections 114. For purposes of discussion, it is assumed herein that the request 204 does not specify an entity for the "collection" role.

Although the examples described herein relate primarily to what is referred to as the "play music" intent, the described techniques may be performed with respect to other intents, which may relate to different domains. For example, the "play music" intent may be one of different types of "play content" intents, which may relate to different types of media or content such as movies, videos, books, articles, spoken word, pictures, etc. Furthermore, intents and roles similar to those described herein may be have different names than those described, and the roles for particular intents or actions may be defined in terms of different types of entities. For example, the "collection" role discussed herein may in certain embodiments comprise a "service" role, which may refer to different online services from which music may be obtained. In the examples described herein, however, a "collection" may more generally comprise a service, a device, or any other source, location, or logical grouping of content.

The natural language understanding 208 detects and/or produces one or more role:entity pairs 210 based on its analysis of the user utterance 204. Each role:entity pair indicates a semantic role and a corresponding entity that has been determined by the system 100 as being intended by the user to fill the role.

An action 212 comprises identifying multiple collections 114 that have matching music, for which the detected semantic role of the role:entity pair 210 is filled by the detected entity of the role:entity pair 210. In cases where multiple role:entity pairs 210 are detected by the NLU 208, the action 212 may identify music collection having music that matches all of the detected role:entity pairs.

As an example, the NLU 208 may detect the role "artist" and the corresponding entity "The Rolling Stones." In this case, the action 212 comprises identifying music collections having music where the artist is "The Rolling Stones." As another example, the NLU 208 may detect the role "track" and the corresponding entity "Angie." In response, the action 212 comprises identifying music collections having the song "Angie."

An action 214 comprises selecting one of the identified collections from which to obtain the requested or matching music. In the described embodiment, this action may include identifying and comparing feature scores of each available music collection, where the feature scores relate to usage characteristics of the different music collections.

Each of multiple feature scores is associated with one of the collections 114. Generally, a feature score characterizes a relationship of the associated music collection to one or more of (a) the semantic role and corresponding entity indicated by the role:entity pair 210 and (b) one or more users. As an example a feature score may indicate the amount of usage of the collection by a user or by a group of users. Different feature scores may characterize different types or categories of usage, or may define usage based on historical patterns of different users or groups of users.

FIGS. 3 and 4 illustrate aspects of features scores as they may be used in certain embodiments. FIG. 3 illustrates a single role:entity pair 302 and multiple collections 304, represented as a graph with edges from each of the collections 304 to the role:entity pair 302. The edges represent relationships between the collections 304 and the role:entity pair 302. A set of feature scores $S_n$ is associated with each relationship, indicating scores for different features of the relationship.

FIG. 4 illustrates relationship features and scores in the larger context of multiple role:entity pairs. In FIG. 4, a table 402 contains a section 404 for each of multiple role:entity pairs. Each section 404 has rows corresponding respectively to different available collections 1 through N and columns corresponding respectively to different features 1 through M. Each feature describes an element of the relationship between the role:entity and the collection. At the intersection of each collection row and feature column is a score, indicating a measurement of the feature's presence in the collection.

An individual feature may in some cases be global, meaning that it is the same for all users or for a group of users. Other features may be local, meaning that they vary from one user to another. Thus, the table 402 may be different for each user. More specifically, the local features of the table 402 may have scores that vary between different users.

Similarly, feature scores may be general or specific in terms of whether or not they apply to content in general or to the specific content that has been requested by the user. A general score, for example, may indicate general usage of each collection, without regard for the specific content that is being requested. Alternatively, a more specific score may indicate usage of each collection for playing the particular requested music, music by the same artist, music of the same genre, and so forth. Usage scores may be given in terms of the number of times that the relevant music has been played from each of the available services.

Features may indicate or relate to various characteristics of the music collections, including characteristics of usage by different users and types of users in the context of music that matches the role:entity. For example, features may indicate amounts of usage of the music collections for obtaining the requested music, for obtaining music that matches the role:entity, for music of the same genre as the requested music, or for music having other similarities to the requested music.

Features may correspond to different types of users. For example, feature scores may indicate one or more of the following:
  amounts of usage of the music collections by the current user;
  amounts of usage of the music collections by all users or groups of users other than the current user; or
  amounts of usage of the music collections by a category of user, such as users having similar characteristics or similar listening histories as the current user.

Certain features may also be more limited in the types of usage that are considered or accounted for. In particular, certain feature scores may indicate usage parameters in the context of the requested music and/or to types or genres of music similar to the requested music. For example, such feature scores may indicate:
  amounts of usage of the music collections by a current user for obtaining the matching music or similar music;
  amounts of usage of the music collections by users other than the current user for obtaining the matching music or similar music; or
  amounts of usage of the music collections by a category of users for obtaining the matching music or similar music.

Certain feature scores may also indicate usage of the music collections by a particular type of client device, such as a mobile device.

Amounts of usage may be evaluated as a function of the number of times the services have been used, as the recent frequency of usage, or based on other parameters. The features scores may also indicate other characteristics, such as relevance or confidence scores returned by the services when searching for music that matches the detected role: entity. For example, a feature score may indicate a level of confidence regarding whether a particular source has the requested content.

The features scores of the table 402 may be calculated based on information obtained from the music collections themselves, from recorded historical choices and actions of the current user and/or other users, from various databases or knowledge bases, and/or from any other sources that may contain information about collection usage and/or popularity in various contexts.

The feature scores of FIG. 4 may be calculated for each user or for each group or category of users. The feature scores may in some cases be pre-calculated for different known role:entity pairs. In other cases, the feature scores may be calculated on demand, in response to requests by the user that indicate specific role:entity pairs.

Returning to FIG. 2, the action 214 may in some cases be performed by calculating a composite feature score for each of the music collections and selecting the music collection having the highest composite score. A composite score may be calculated by averaging the individual feature scores for a collection. In some cases, the different feature scores may be given different weights when performing the averaging or calculating the composite score, resulting in a weighted composite score for each of the collections. For example, a feature indicating usage by the current user may be weighted more heavily than a feature indicating usage by a general population of users.

An action 218 comprises obtaining and playing the requested music from the selected one of the music collections.

Figure 5:
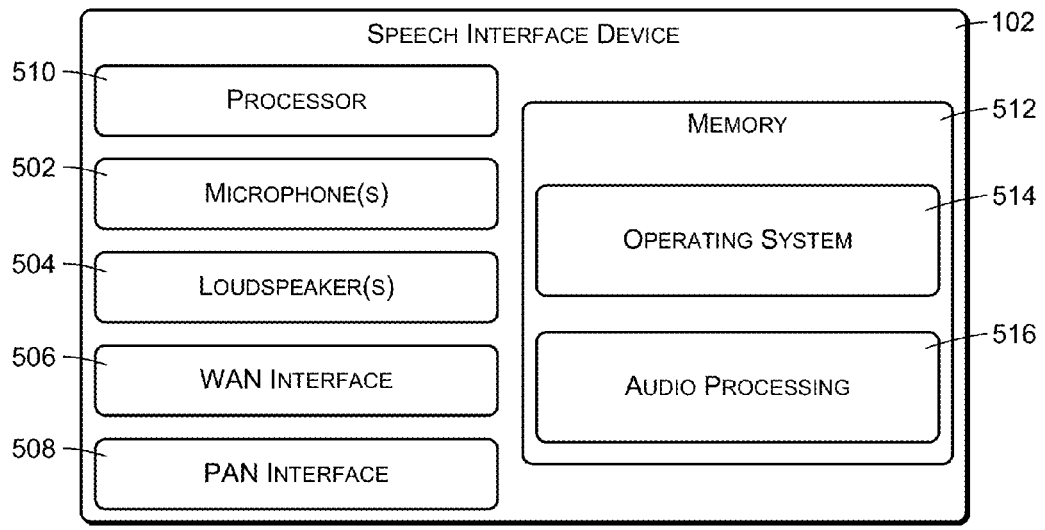
FIG. 5 is a block diagram showing high-level components of an example speech interface device.

FIG. 5 illustrates relevant logical or functional components of the example interface device 102. The interface device 102 includes one or more microphones 502 and one or more loudspeakers 504. The speech interface device 102 may also have a local-area network (LAN) interface 506 such as a wireless LAN interface, a Wi-Fi® interface, an Ethernet interface, a cellular network interface, or any other communications interface allowing communications with the speech-based service 106. The network interface 506 may be configured to communicate with the speech-based service 106 through a public, wide-area network such as the Internet. The network interface 506 may communicate with or through a local router or access point in some implementations.

The interface device 102 may also have a personal-area network (PAN) communications interface 508 such as a Bluetooth® interface or other wireless, device-to-device peripheral interface. The PAN interface 508 may be configured to pair with multiple audio devices or content sources such as media players, smartphones, and so forth.

The interface device 102 may have operational logic, which in many cases may comprise a processor 510 and memory 512. The processor 510 may include multiple processors and/or a processor having multiple cores, and may include digital signal processors. The memory 512 may contain applications and programs in the form of instructions that are executed by the processor 510 to perform acts or actions that implement desired functionality of the interface device 102, including the functionality specifically described herein. The memory 512 may be a type of computer storage media and may include volatile and non-volatile memory. Thus, the memory 512 may include, but is not limited to, RAM, ROM, EEPROM, flash memory, or other memory technology.

The interface device 102 may have an operating system 514 that is executable to manage hardware and services within and coupled to the interface device 102. In addition, the interface device 102 may in some cases include audio processing components 516 for processing input audio signals generated by the microphone 502 and/or output audio signals provided to the loudspeaker 504.

Figure 6:
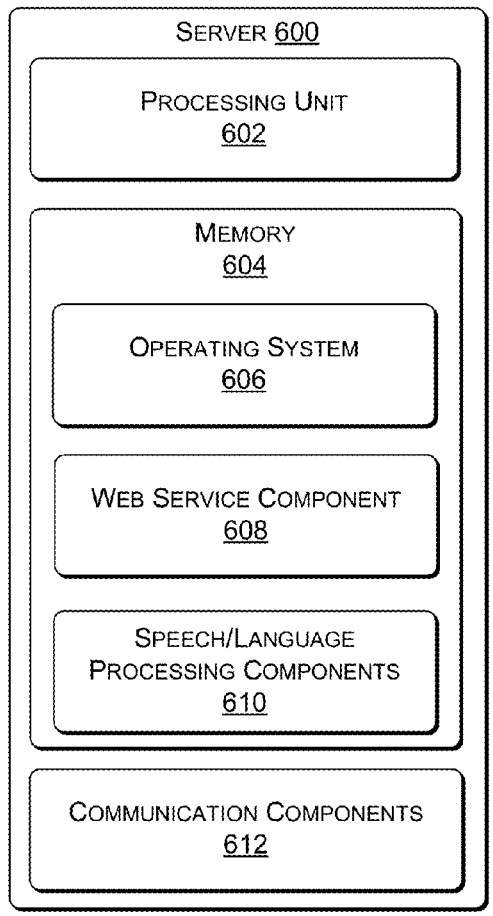
FIG. 6 is a block diagram showing high-level components of an example computer server such as may be used in implementing speech-based services.

FIG. 6 illustrates relevant components of a server 600 that may be used to implement the speech-based service 106. The speech-based service 106 may be implemented by one or more servers or server instances, with the various functionality described above distributed in various ways across the different servers. Servers may be located together or separately, and organized as virtual servers, server banks, and/or server farms. The described functionality may be provided by the servers of a single entity or enterprise, or may utilize the servers and/or services of multiple entities or enterprises.

In a very basic configuration, the example server 600 may comprise a processing unit 602 having one of one or more processors and associated memory 604. The memory 604 may comprise computer storage media and may include volatile and nonvolatile memory. Thus, the memory 604 may include, but is not limited to, RAM, ROM, EEPROM, flash memory, or other memory technology, or any other medium which can be used to store data.

The memory 604 may be used to store any number of functional components that are executable on the processing unit 602. As examples, the memory 604 may store an operating system 606 and a web services component 608 for communicating with client devices.

The memory 604 may also contain speech and language processing components such as the ASR component 108, the NLU component 110, and the dialog management component 112, all of which are discussed above with reference to FIG. 1.

The server 600 may also include communications components 612 for network communications with other network entities, including clients such as the interface device 102 as well as other servers.

The server 600 may of course include many other logical, programmatic, and physical components, of which those shown in FIG. 6 are merely examples that are related to the discussion herein.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:
1. A system, comprising:
one or more processors;
one or more computer-readable media storing computer-executable instructions that, when executed on the one or more processors, cause the one or more processors to perform acts comprising:
receiving an audio signal corresponding to a spoken request that expresses a play content intent, wherein the spoken request indicates a semantic role and an entity;
analyzing the audio signal to detect the semantic role and the entity;

identifying multiple content collections that have matching content for which the semantic role is filled by the entity;

identifying feature scores of each content collection, wherein an individual feature score of a particular content collection indicates an amount of usage of the content collection by one or more users;

calculating a composite score for each content collection based at least in part on the feature scores of the content collection;

selecting one of the multiple content collections by analyzing the calculated composite scores of the content collections;

receiving the matching content from the selected content collection; and playing the matching content.

2. The system of claim 1, wherein:

the play content intent comprises a play music intent;

the semantic role comprises at least one of an artist, an album, or a track; and the content collections comprise music collections.

3. The system of claim 1, wherein the content collections comprise at least one of video, music, audio books, or spoken word.

4. The system of claim 1, wherein calculating the composite scores comprises weighting the feature scores.

5. The system of claim 1, wherein the content collections comprise at least one of:

network-accessible content services;

local content repositories; or user-owned content libraries.

6. A method comprising:

receiving, by one or more processors, an audio signal corresponding to a natural language request that expresses an intent, wherein the request indicates an entity that fills a semantic role of the intent;

analyzing, by the one or more processors, the audio signal to detect the semantic role and the entity;

identifying, by the one or more processors, multiple content sources that have matching content for which the semantic role is filled by the entity;

identifying, by the one or more processors, at least one feature score for each of the content sources, wherein the at least one feature score characterizes usage of the content sources by one or more users;

selecting, by the one or more processors, one of the content sources based at least in part on the at least one feature score; and receiving, by the one or more processors, the matching content from the selected content source.

7. The method of claim 6, wherein the at least one feature score of a particular content source characterizes a usage relationship of the particular content source to at least one of (a) the semantic role and entity or (b) one or more users.

8. The method of claim 6, wherein the at least one feature score characterizes at least one of:

usage of the content sources by a current user;

usage of the content sources by users other than the current user; or usage of the content sources by a category of users.

9. The method of claim 6, wherein the at least one feature score characterizes usage of the content sources for obtaining the matching content.

10. The method of claim 6, wherein the at least one feature score characterizes usage of the content sources for obtaining content that is similar to the matching content.

11. The method of claim 6, wherein the at least one feature score characterizes at least one of:

usage of the content sources by a current user for obtaining the matching content;

usage of the content sources by users other than the current user for obtaining the matching content; or usage of the content sources by a category of users for obtaining the matching content.

12. The method of claim 6, wherein the content sources comprise at least one of:

network-accessible services;

local content repositories; or user-owned content libraries.

13. A method comprising:

receiving, by one or more processors, an audio signal corresponding to a natural language request from a current user, wherein the natural language request indicates requested content;

identifying, by the one or more processors, multiple sources that have the requested content;

identifying, by the one or more processors, at least one feature score for each of the sources, wherein the feature scores characterize at least one of (a) usage of the sources by one or more users; or (b) usage of the sources for providing the requested content; and selecting, by the one or more processors, one of the sources based at least in part on the at least one feature score.

14. The method of claim 13, wherein the at least one feature score for a particular one of the sources comprises a level of confidence that the particular one of the sources has the requested content.

15. The method of claim 13, wherein the at least one feature score characterizes at least one of:

usage of the sources by a current user;

usage of the sources by users other than the current user; or usage of the sources by a category of users.

16. The method of claim 13, wherein the at least one feature score characterizes usage of the sources for obtaining the requested content.

17. The method of claim 13, wherein the at least one feature score characterizes usage of the sources for obtaining content that is similar to the requested content.

18. The method of claim 13, wherein the at least one feature score characterizes at least one of:

usage of the sources by a current user for obtaining the requested content;

usage of the sources by users other than the current user for obtaining the requested content; or usage of the sources by a category of users for obtaining the requested content.

19. The method of claim 13, wherein the sources comprise at least one of:

network-accessible services;

local content repositories; or user-owned content libraries.

* * * * *